US009298175B2

(12) United States Patent
Kim et al.

(10) Patent No.: US 9,298,175 B2
(45) Date of Patent: Mar. 29, 2016

(54) METHOD FOR DETECTING ABNORMAL TRAFFIC ON CONTROL SYSTEM PROTOCOL

(71) Applicant: Electronics and Telecommunications Research Institute, Daejeon (KR)

(72) Inventors: Byoung-Koo Kim, Daejeon (KR); Dong Ho Kang, Daejeon (KR); Seon-Gyoung Sohn, Daejeon (KR); Youngjun Heo, Daejeon (KR); Jung-Chan Na, Daejeon (KR); Ik Kyun Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 469 days.

(21) Appl. No.: 13/933,822

(22) Filed: Jul. 2, 2013

(65) Prior Publication Data

US 2014/0297004 A1 Oct. 2, 2014

(30) Foreign Application Priority Data

Mar. 26, 2013 (KR) ........................ 10-2013-0032212

(51) Int. Cl.
*H04L 12/26* (2006.01)
*G05B 15/02* (2006.01)
*H04L 29/06* (2006.01)
*H04L 12/40* (2006.01)

(52) U.S. Cl.
CPC ............ *G05B 15/02* (2013.01); *H04L 63/0263* (2013.01); *H04L 63/1408* (2013.01); *H04L 63/1425* (2013.01); *H04L 63/1441* (2013.01); *H04L 63/20* (2013.01); *H04L 2012/40228* (2013.01)

(58) Field of Classification Search
CPC .... G05B 15/02; H04L 63/0218; H04L 67/12; H04L 63/0263; H04L 67/125; H04L 63/1425; H04L 63/20; H04L 2012/40228; H04L 63/1408; H04L 63/1441; G06F 21/50
USPC .................... 700/80, 295, 286; 370/242, 465; 726/11, 23; 709/206
See application file for complete search history.

(56) References Cited

FOREIGN PATENT DOCUMENTS

KR 101023708 B1 3/2011

OTHER PUBLICATIONS

Pauline Koh et al., "Intrusion Detection Methodology for SCADA system environment based on traffic self-similarity property," Korea Institute of Information Security and Cryptology, 2012, pp. 267-281, vol. 22, No. 2, Graduate School of Information Security in Korea University, Korea Internet & Security Agency, Seoul, Korea.

*Primary Examiner* — Wei Zhao
*Assistant Examiner* — Lionel Preval
(74) *Attorney, Agent, or Firm* — William Park & Associates Ltd.

(57) ABSTRACT

A method for detecting an abnormal traffic on a control system protocol, includes: checking whether session information exists in a management table; adding a new entry to the management table; checking whether a transaction ID in a table entry is the same as that of the received MODBUS request message; and checking whether data and length thereof of the received MODBUS request message are the same as those in the table entry. Further, the method includes detecting an abnormal traffic; and updating the table entry with packet information of the MODBUS request message.

12 Claims, 15 Drawing Sheets

Type 2-3

Type 3

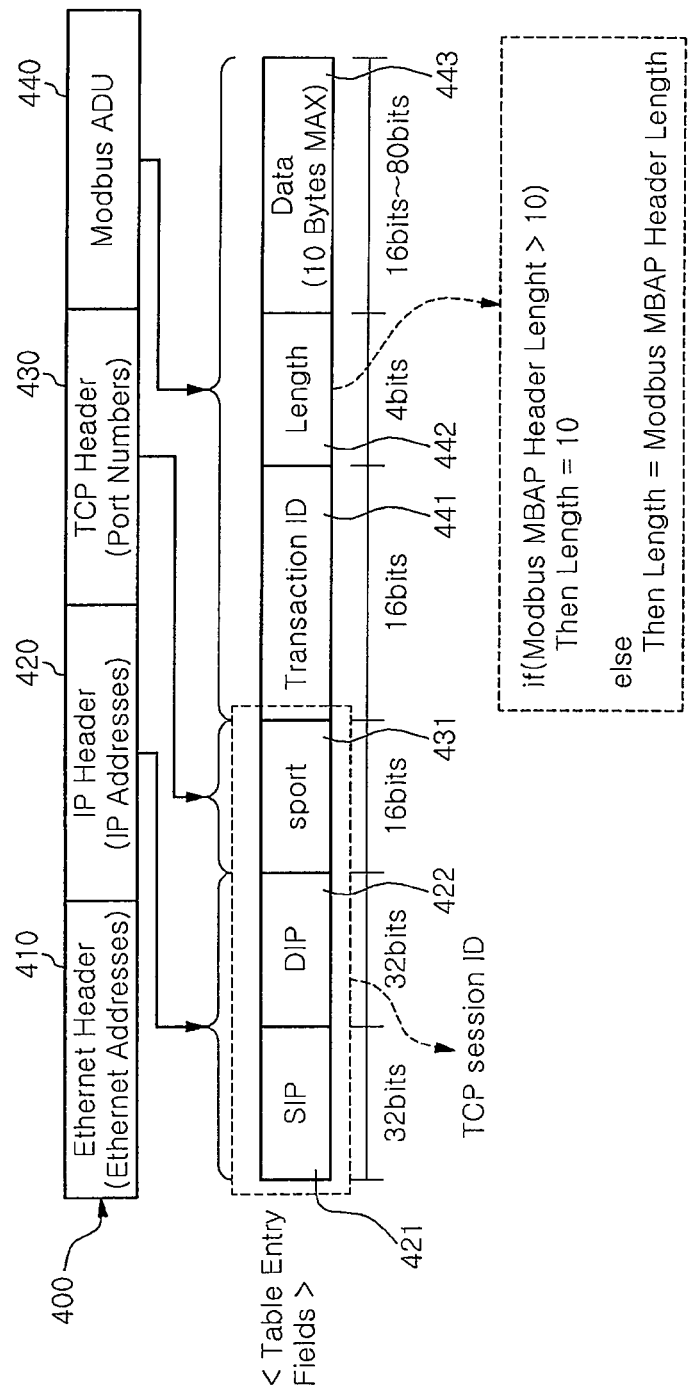

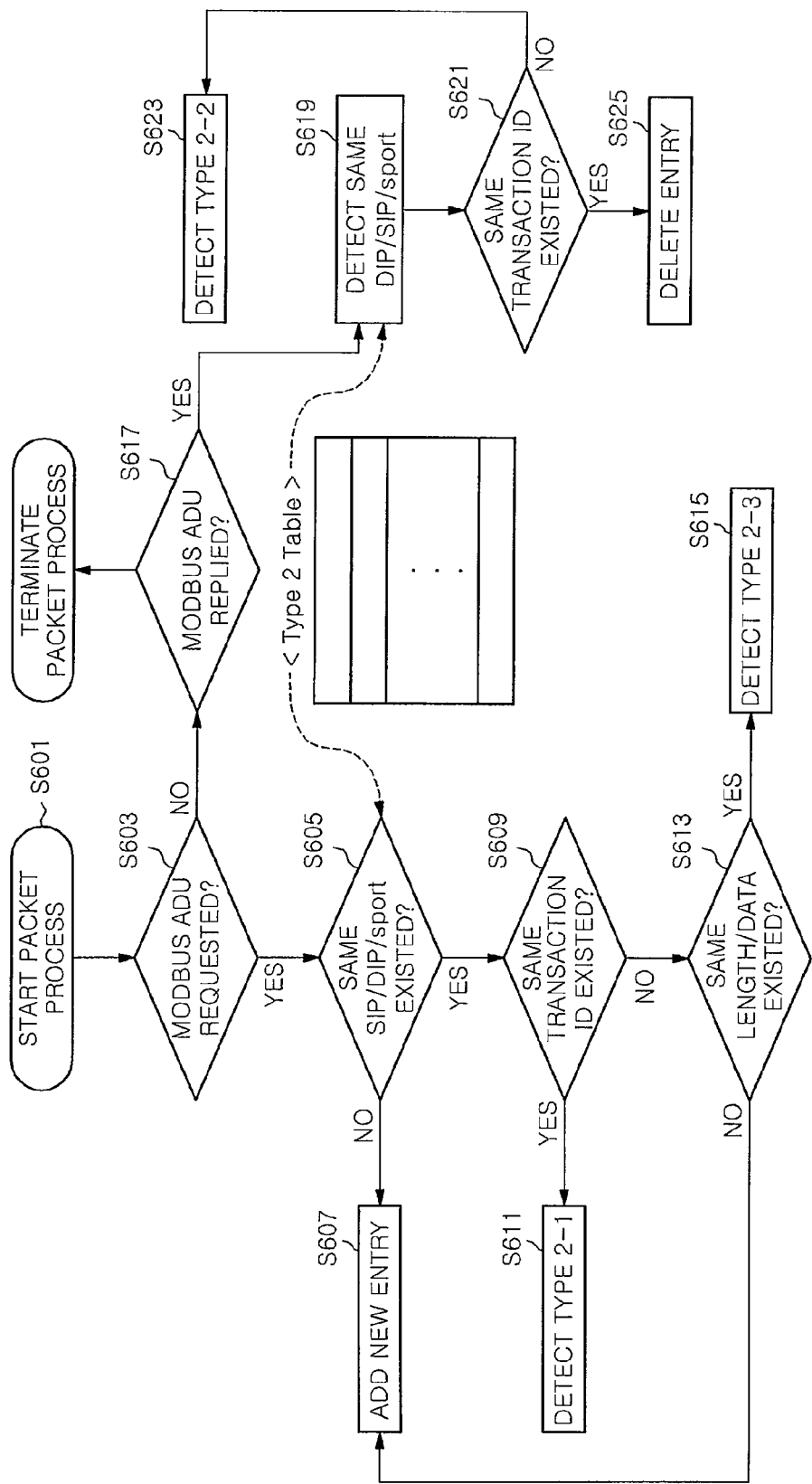

FIG. 10B

| < Type 1 Table > | |
|---|---|
| a | x |
|  |  |
| ⋮ | ⋮ |
|  |  |

| < Type 2,3 Table > | |
|---|---|
| a | x |
|  |  |
| ⋮ | ⋮ |
|  |  |

(a) CONSTRUCT TABLE WHEN RECEIVING PACKET (b) CONSTRUCT TABLE WHEN RECEIVING PACKET

| | |
|---|---|
| b | y |
|  |  |
| ⋮ | ⋮ |
|  |  |

| | |
|---|---|
| a | x |
| b | y |
| ⋮ | ⋮ |
|  |  |

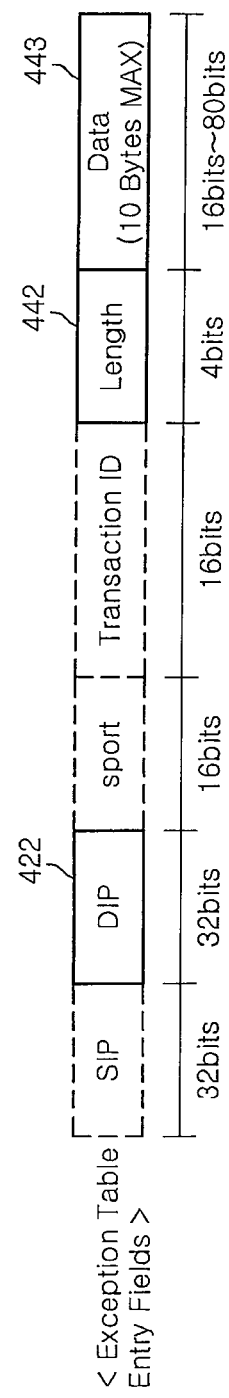

METHOD FOR DETECTING ABNORMAL TRAFFIC ON CONTROL SYSTEM PROTOCOL

CROSS-REFERENCE TO RELATED APPLICATION(S)

The present invention claims priority of Korean Patent Application No. 10-2013-0032212, filed on Mar. 26, 2013, which is incorporated herein by reference.

FIELD OF THE INVENTION

The present invention relates to a method for detecting an abnormal traffic on a control system protocol, and more particularly, to a method for detecting an abnormal traffic on a control system protocol, capable of detecting an abnormal traffic on a control system protocol in an early stage and responding to it.

BACKGROUND OF THE INVENTION

A control system refers to a system that is used for the purpose of monitoring and maintaining a remote system efficiently, which is used to operate national major facilities such as electric power, gas, water and sewage and transportation. As a closed control system protocol standard is gradually disclosed as an international standard, attackers are provided with much more knowledge on control systems and network operations so that possibility and risk of cyber invasion to a control system are becoming higher and higher. First of all, when there occurs an accident of cyber invasion to a control system, it may cause a national disaster so that a special security management is required.

MODBUS that is one of the control system protocols is an industrial communication protocol used to control PLC (Programmable Logic Controller). The MODBUS is an application layer message protocol that provides a client/server based request/reply communication using a variety of transmission media and is one of communication methods widely used in the worldwide industrial application.

The communication method of the MODBUS protocol is generally classified into MODBUS Serial, MODBUS Plus, and MODBUS TCP/IP. The MODBUS Plus is used to communicate between host systems before the MODBUS TCP/IP was developed. Since the MODBUS TCP/IP was developed; however, it became a main communication method because it has the dominant position in the communication speed and system applicability. Instead, the existing MODBUS Plus and the MODBUS 232/485 are generally used in such a manner that they are converted into the MODBUS TCP/IP using a gateway and then connected to a host system.

As such, while the MODBUS is becoming a general protocol standard of a SCADA system, there is a problem in that the system can be easily attacked exploiting it. Especially, not because of attacking the SCADA system in a complicated manner using a malicious code such as Stuxnet, but because of directly attacking the weakness of MODBUS that is a protocol of the SCADA system, the risk may be more serious.

For example, when using Dismal attacking tools, it may be possible to collect information on what system is used depending on facilities, such as a hydraulic power plant and a thermoelectric power plant. That is, when Dismal is commanded to collect information, system information is transferred to an attacker regardless of system type, and malicious instructions may also be transferred. Accordingly, it can be said that problem is the protocol itself rather than the Zero-day attack such as the Stuxnet since the protocol may be attacked by merely manipulating a packet. That is, there is a possibility that a new type of attack may be occurred at any time by simply manipulating a packet.

Further, since the MODBUS protocol does not consider security requirements such as authentication or authorization with respect to replies of a server for requests of a client, it started to consider security requirements in view of a Denial of Service attack as well as the security weakness of the control protocol in the electric power field. It is because several devices can be crashed or loaded even by a general network traffic such as broadcast/multicast.

In conclusion, while there has been increasing concern about activities to interrupt a safe system operation of major infrastructure control system because of intentional or unintentional actions, current enterprise security goods such as Firewall, IDS (Intrusion Detection System) and IPS (Intrusion Prevention System) focus on external network boundary areas so that they are vulnerable to problems occurring in an internal infrastructure. That is, in the state that there is a variety of penetration routes including an insider threat, a control network also focuses on a warning network security so that it is vulnerable to a method to analyze inner behaviors. Accordingly, in order to provide a stable service between control systems, a security mechanism suitable to a control system protocol is required.

SUMMARY OF THE INVENTION

In view of the above, the present invention provides a method for detecting an abnormal traffic on a control system protocol, capable of detecting an abnormal traffic on a control system protocol in an early stage and responding to it.

In accordance with a first aspect of the present invention, there is provided a method for detecting an abnormal traffic on a control system protocol.

The method includes checking whether session information exists in a management table when a received packet is a MODBUS request message; adding a new entry to the management table when the session information does not exist in the management table; checking whether a transaction ID in a table entry is the same as that of the received MODBUS request message when the session information exists in the management table; checking whether data and length thereof of the received MODBUS request message are the same as those in the table entry when the transaction ID of the table entry is not the same as that of the MODBUS request message; detecting an abnormal traffic when the transaction ID of the table entry is the same as that of the MODBUS request message, or the data of the table entry is the same as that of the MODBUS request message; and updating the table entry with packet information of the MODBUS request message when the data of the table entry is not the same as that of the MODBUS request message.

Further, the method may further comprise deleting the MODBUS request message detected as the abnormal traffic, or alerting detection of the abnormal traffic.

Further, the table entry managed in the management table may be deleted by a timer or using session termination information.

In accordance with a second aspect of the present invention, there is provided a method for detecting an abnormal traffic on a control system protocol.

The method includes checking whether session information exists in a management table when a received packet is a MODBUS request message; checking whether a transaction ID in a table entry is the same as that of the received MOD- BUS request message when the session information exists in the management table; checking whether data and length thereof of the received MODBUS request message are the same as those in the table entry when the transaction ID of the table entry is not the same as that of the MODBUS request message; adding a new entry to the management table when the session information does not exist in the management table or when the data and length thereof of the received MODBUS request message are not the same as those in the table entry; and detecting an abnormal traffic when the transaction ID in the table entry is the same as that of the MODBUS request message and when the data of the received MODBUS request message is the same as that in the table entry.

Further, the method may further comprise checking whether session information exists in the management table when the received packet is a MODBUS reply message; deleting, when an entry having the same session information as that of the MODBUS reply message exists in the management table, the entry; and detecting, when an entry having the same session information as that of the MODBUS reply message exists in the management table, an abnormal traffic when an entry having the same session information as that of the MODBUS reply message exists in the management table while an entry having the same transaction ID as that of the MODBUS reply message is not registered.

Further, the method may further comprise deleting the MODBUS request message detected as an abnormal traffic or alerting an abnormal traffic detection.

Further, the table entry managed in the management table may be deleted by a timer or using session termination information.

In accordance with a third aspect of the present invention, there is provided a method for detecting an abnormal traffic on a control system protocol.

The method includes checking whether session information exists in an exception table when a received packet is a MODBUS request message; checking whether data of the MODBUS request message is the same as that in an entry existing in the exception table when the session information exists in the management table; adding a new entry having information of the relevant message to the exception table when the session information does not exist in the management table, or the data of the MODBUS request message is not the same as that in an entry existing in the exception table even though the session information exists in the management table; and detecting an abnormal traffic when the session information exists in the management table and an entry having the same data as the MODBUS request message exists in the management table.

Further, the method may further comprise checking whether session information exists in the management table when the received packet is a MODBUS reply message; detecting an abnormal traffic when an entry having the same session information as the MODBUS reply message does not exist in the management table; checking whether a function code of the MODBUS reply message indicates an error when an entry having the same session information as the MODBUS reply message exists in the management table and when an entry having the same transaction ID as the MODBUS reply message exists in the message table; and generating an exception entry based on information of the relevant entry and adding the exception entry to an exception table when a function code of the MODBUS reply message indicates an error.

Further, the method may further comprise deleting an entry of the management table when a function code of the MODBUS reply message does not indicate an error or after the exception entry is added to the exception table.

Further, the method may further comprise deleting the MODBUS request message that is detected as an abnormal traffic or alerting an abnormal traffic detection.

Further, the table entry managed in the management table may be deleted by a timer or using session The embodiment of the present invention provides a stable connection service between control systems by detecting and responding to an abnormal traffic in an early stage that interrupts a normal service connection on a control system protocol or causes an error. It enables a quick detection and response to an abnormal traffic caused by an error of a system and a network as well as an attacker's intentional behavior.

The above described may be achieved by tracking and managing transmission/reception messages between control systems and then analyzing abnormal traffic types. Accordingly, by detecting an abnormal traffic on a control system protocol in an early stage, it is possible to block activities to interrupt safe system operations of a significant infrastructure control system caused by intentional or unintentional behaviors, and to secure reliability and availability of service by quickly discovering and responding to security threat within a control network.

BRIEF DESCRIPTION OF THE DRAWINGS

The above and other objects and features of the present invention will become apparent from the following description of embodiments given in conjunction with the accompanying drawings, in which:

FIG. 7A shows a structure of a table for detecting types of abnormal traffic in accordance with an embodiment of the present invention;

FIG. 9 is a flow chart illustrating a detection mechanism for Type 2 shown in FIGS. 5A and 5B;

FIGS. 10A and 10B are exemplary views illustrating a difference between entry storage methods of a table used in the detection mechanism of Type 1 shown in FIG. 4 and a table used in Types 2 and 3;

FIG. 11 illustrates a structure of an exception table that is used to detect types of abnormal traffic of Type 3 shown in FIG. 6.

DETAILED DESCRIPTION OF THE EMBODIMENTS

Figure 1:
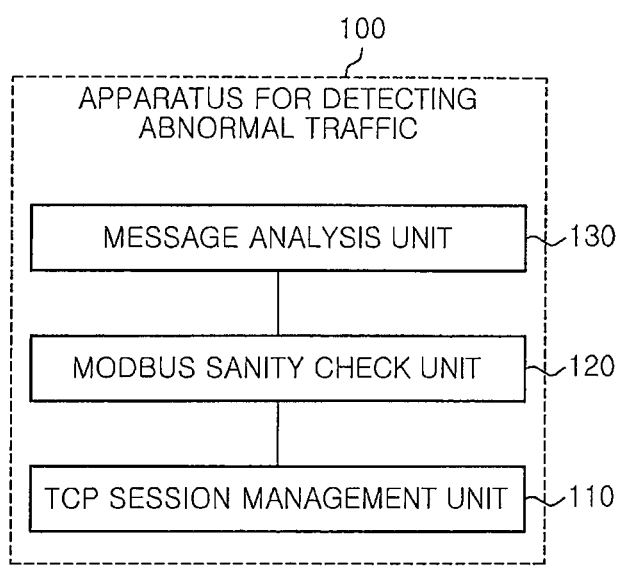
FIG. 1 is a block diagram of an apparatus for detecting an abnormal traffic on a control system protocol in accordance with an embodiment of the present invention.

Advantages and features of the invention and methods of accomplishing the same may be understood more readily by reference to the following detailed description of embodiments and the accompanying drawings. The invention may, however, be embodied in many different forms and should not be construed as being limited to the embodiments set forth herein. Rather, these embodiments are provided so that this disclosure will be thorough and complete and will fully convey the concept of the invention to those skilled in the art, and the invention will only be defined by the appended claims. Like reference numerals refer to like elements throughout the specification.

In the following description of the present invention, if the detailed description of the already known structure and operation may confuse the subject matter of the present invention, the detailed description thereof will be omitted. The following terms are terminologies defined by considering functions in the embodiments of the present invention and may be changed operators intend for the invention and practice. Hence, the terms need to be defined throughout the description of the present invention.

Hereinafter, embodiments of the present invention will be described in detail with reference to the accompanying drawings.

FIG. 1 is a block diagram of an apparatus for detecting an abnormal traffic on a control system protocol in accordance with an embodiment of the present invention.

An apparatus 100 for detecting an abnormal traffic in accordance with an embodiment of the present invention may be arranged in the middle of a MODBUS TCP/IP line in an in-line type to monitor traffics on the line so that it may relay packets. Alternatively, the apparatus 100 may be arranged in any position where the packets can be monitored.

As such, the apparatus 100 for detecting an abnormal traffic is arranged between a MODBUS client and a MODBUS server to monitor and analyze a packet in a control network having a MODBUS TCP/IP communication structure, thereby detecting an abnormal traffic.

The apparatus 100 for detecting an abnormal traffic may include a TCP session management unit 110, a MODBUS sanity check unit 120, and a message analysis unit 130.

The TCP session management unit 110 determines whether a MODBUS transmission/reception message belongs to a TCP session connected normally.

The MODBUS sanity check unit 120 checks whether the MODBUS transmission/reception message violates protocol rules in a simple manner.

The message analysis unit 130 analyzes a MODBUS transmission/reception message that belongs to a TCP session connected normally and does not violate the MODBUS protocol rules and detects an abnormal traffic on a MODBUS communication.

Figure 2:
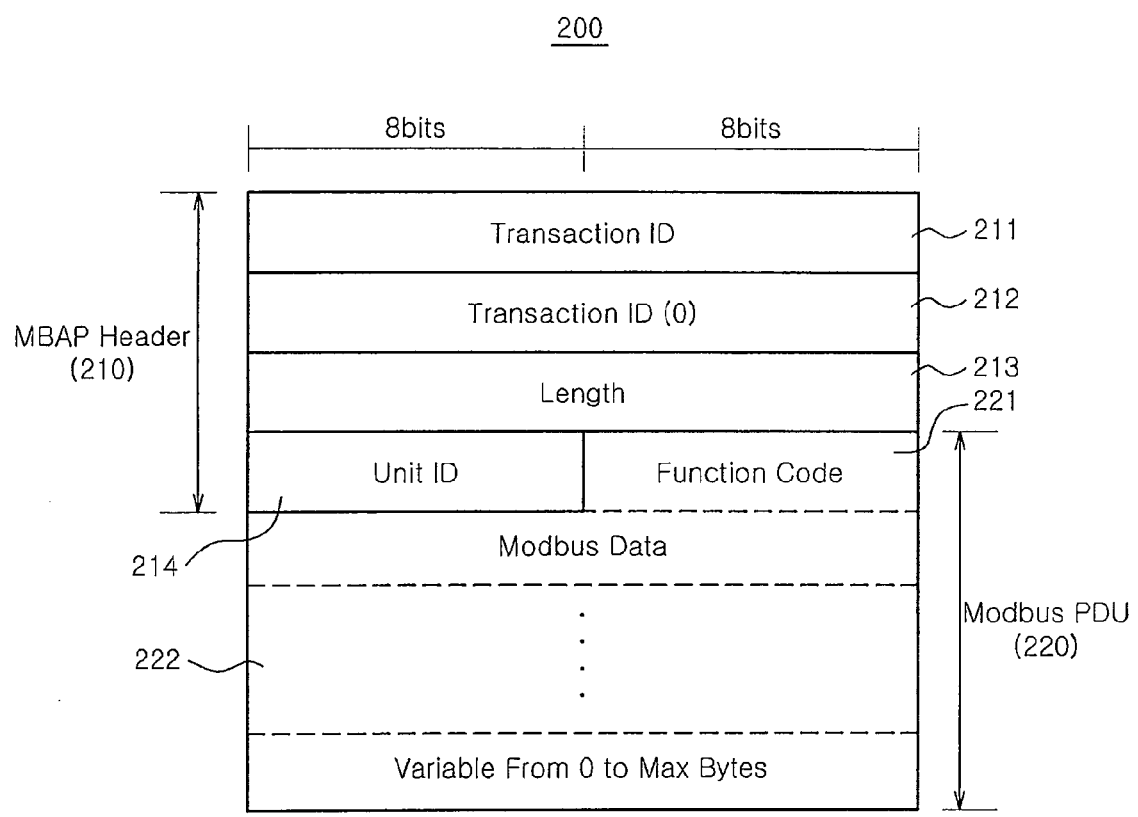
FIG. 2 shows a structure of ADU of a MODBUS TCP/IP in accordance with an embodiment of the present invention.
Figure 7B:
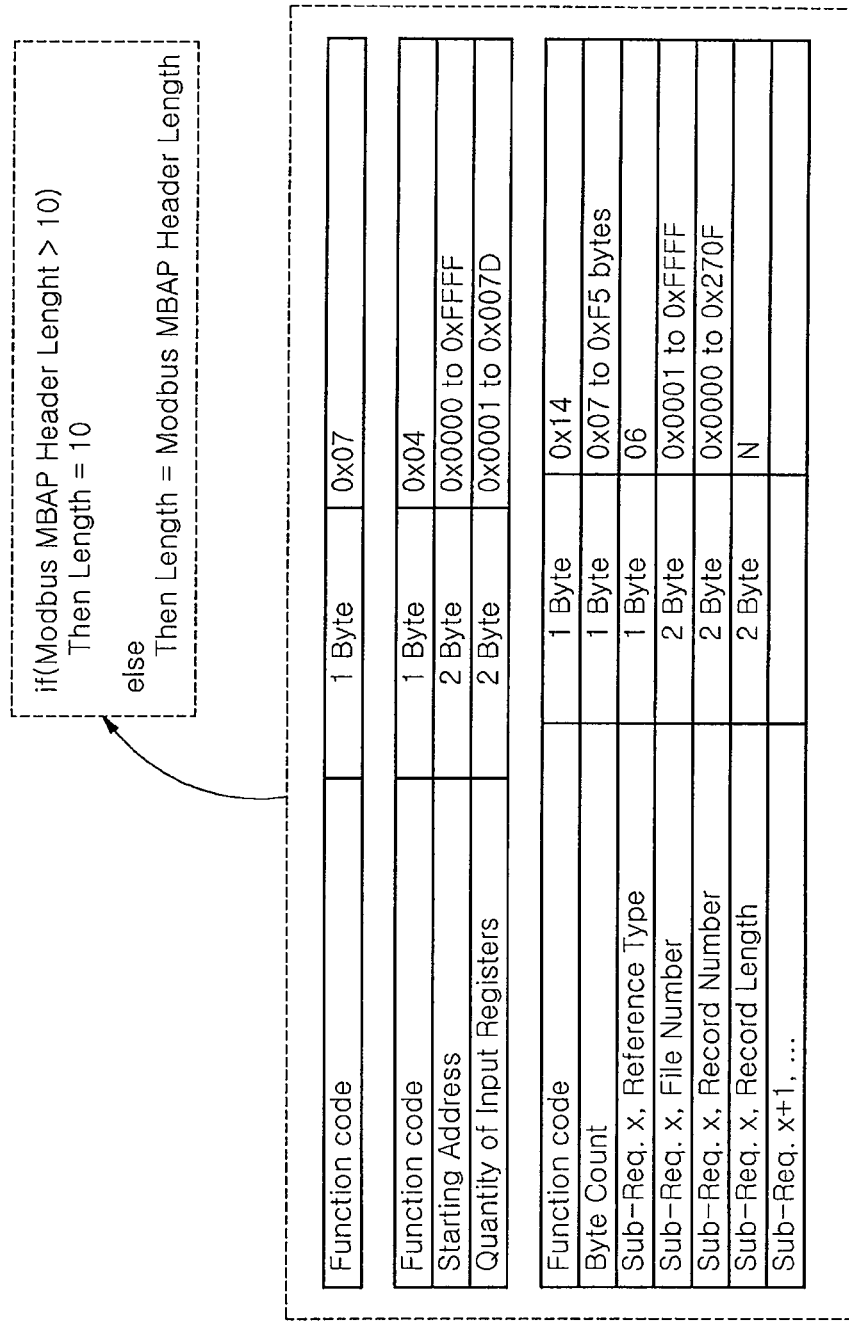
FIG. 7B is an exemplary view of a MODBUS PDU request message.

FIG. 2 shows a structure of an ADU (Application Data Unit) of a MODBUS TCP/IP in accordance with an exemplary embodiment of the present invention. Such an ADU fundamentally exists on a TCP header. It may be understood with reference to a structure of a MODBUS/TCP Ethernet Packet shown in FIGS. 7A and 7B.

As illustrated in FIG. 2, a MODBUS TCP/IP ADU 200 is further classified into a MBAP header (MODBUS Application Protocol Header) 200 having 7 bytes in size and a MODBUS PDU (Protocol Data Unit) 220, and the MODBUS PDU 220 has a variable data size with a function code 221 of at least 1 byte in size.

The MBAP header 210 has a transaction ID 211, a protocol ID 212, a length 213 and a unit ID 214, and the MODBUS PDU 220 has fields such as a function code 221 and a variable data 222.

Here, the transaction ID 211 is an identifier in a TCP session for a MODBUS transmission/reception message. The protocol ID 212 represents a MODBUS protocol, which may be denoted as '0'. The length 213 is a length from a unit ID to the last data, which may use a unit of byte. The unit ID 214 is an identifier for a remote system connected to another bus such as a serial line. The function code 221 is a command code that is requested by a client.

In such a MODBUS TCP/IP ADU 200, fields except the length 213 and the function code 221 have values that are generated in a client, copied in a server as they are and returned to the client.

Figure 3:
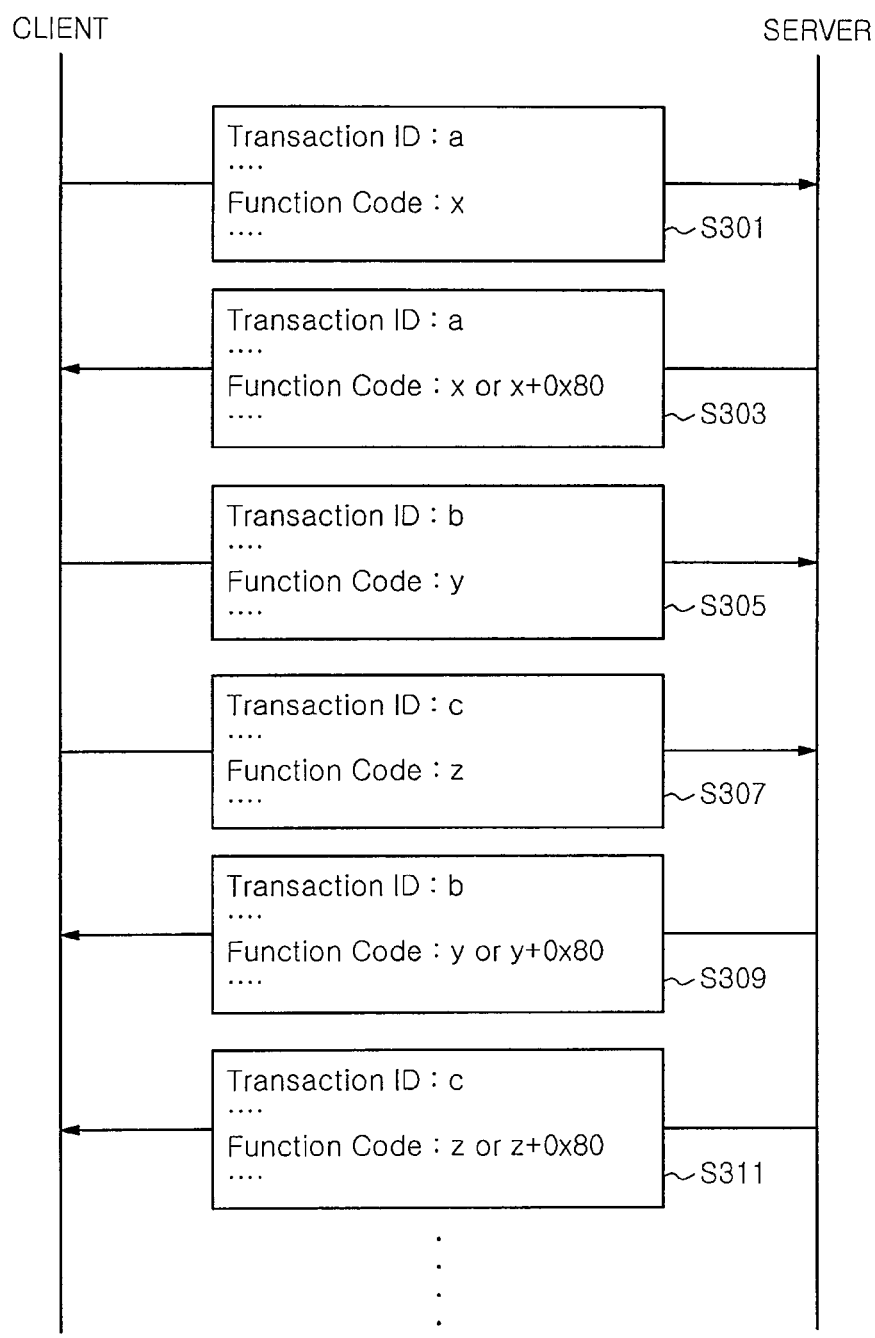
FIG. 3 is a sequence diagram illustrating a method for communicating between control systems using a MODBUS TCP/IP ADU of FIG. 2.

FIG. 3 is a sequence diagram illustrating a method for communicating between control systems using a MODBUS TCP/IP ADU of FIG. 2.

After a TCP session (a service port 502 in a server side) is connected between a client and a server, the client transmits a request message to the server, in operation S301. Accordingly, the server returns a suitable response or error message to the client. Here, while a function code is used as it is in case of a normal response, a value 0x80 is added to a function code value of the response message and then returned in an erroneous case, in operation S303.

A transaction ID is an identifier for a transmission/reception message in the same TCP session, and performs a communication with a different identification value whenever requested. In this case, since each transmission/reception pair can be discriminated using the transaction ID with respect to the request message in the same session of the client, it is possible that after several requests are continuously transferred as shown in FIG. 3, in operations S305 and S30), responses to the requests are received step by step, in operations 5309 and S311.

Figure 4:
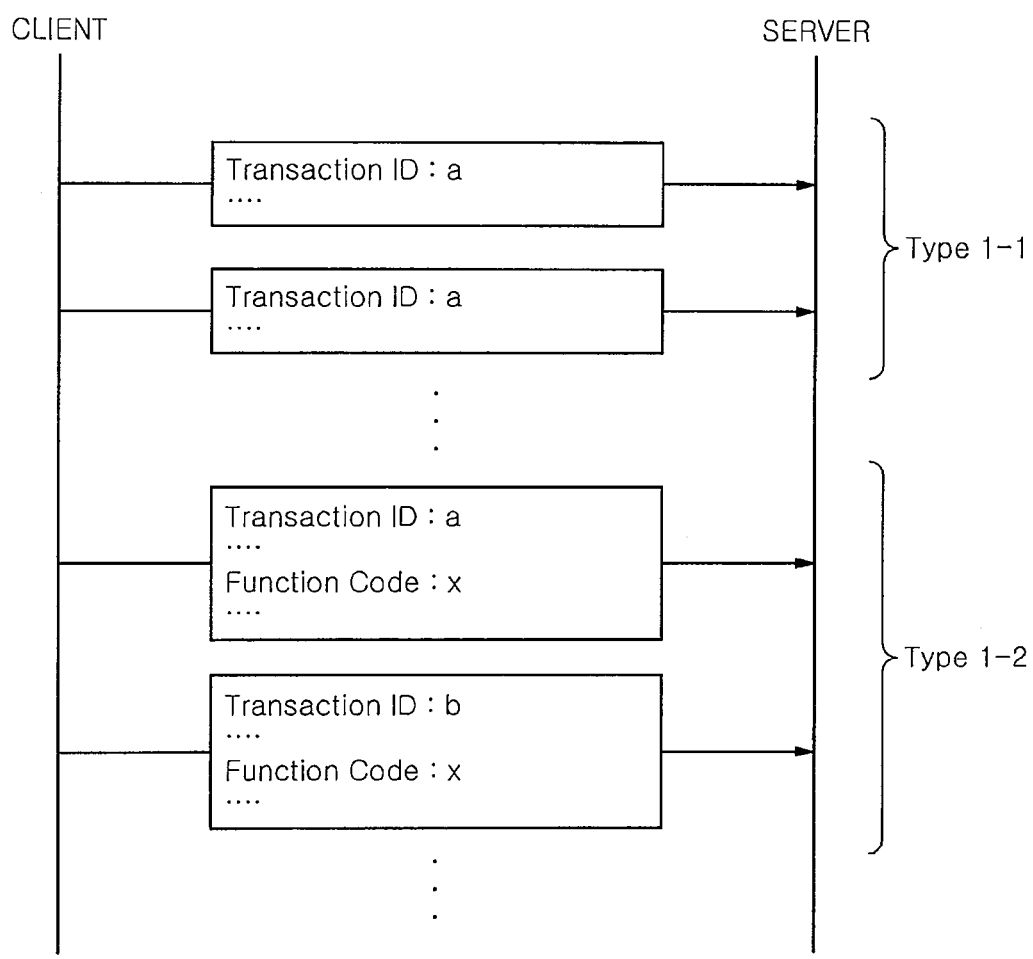
FIGS. 4 to 6 are sequence diagrams illustrating types of abnormal traffic to be detected on the basis of the communication method illustrated in FIG. 3.
Figure 5A:
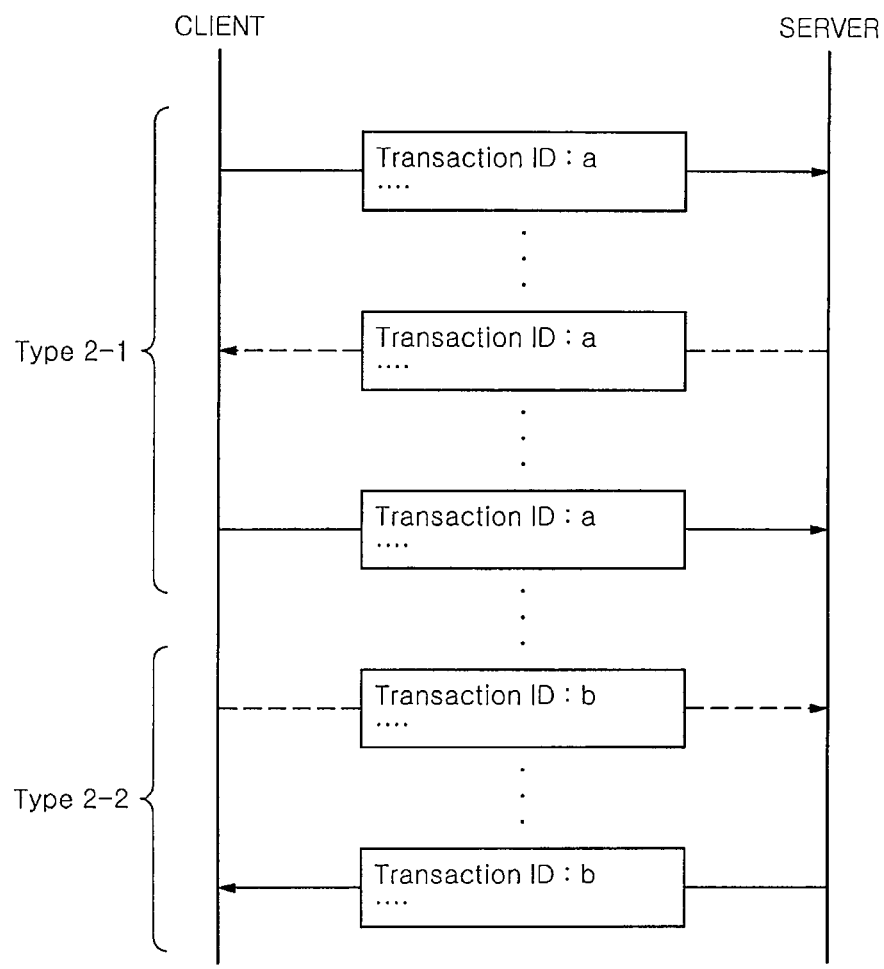
Figure 5B:
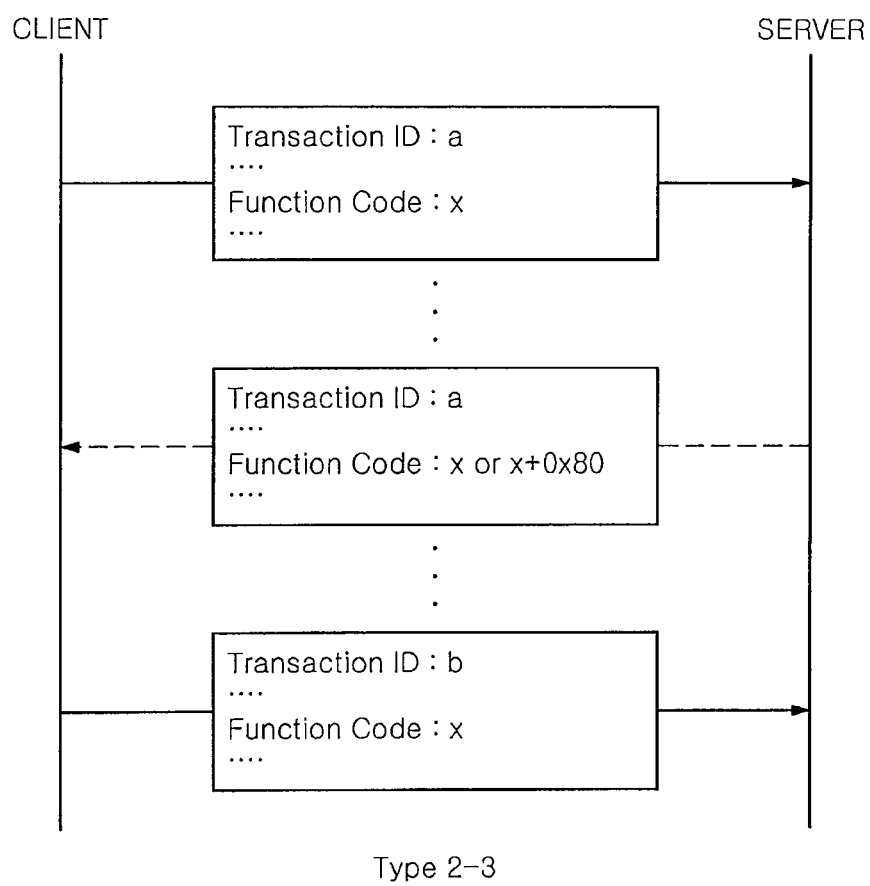
Figure 6:
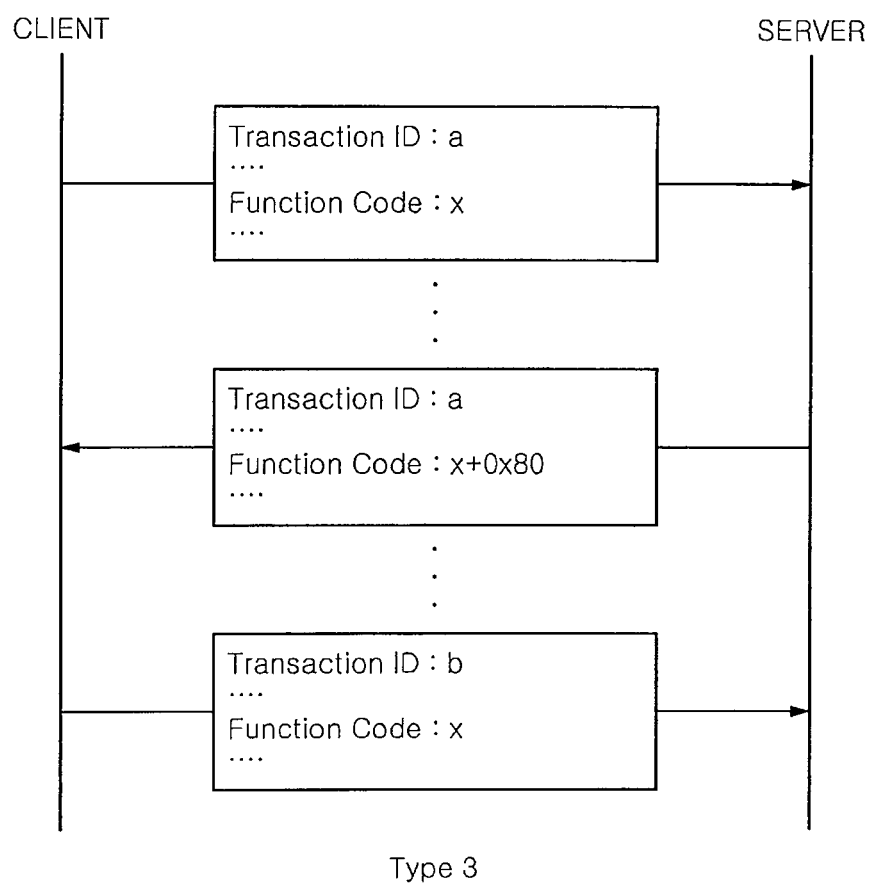

FIGS. 4 to 6 are sequence diagrams schematically illustrating exemplary types of abnormal traffic to be detected on the basis of the communication method illustrated in FIG. 3.

FIG. 4 illustrates a case that request messages having the same transaction ID are continuously generated in the same TCP session (type 1-1), and a case that request messages having the same function code and data but having different transaction ID are continuously generated (Type 1-2). That is, such type of intentional message modulation may interrupt a normal operation of the control system.

FIGS. 5A and 5B indicate a case (Type 2-1) that in the state that there is not a response to a request message having a relevant transaction ID in the same TCP session although the request message is not continuously generated as shown in FIG. 4, a request message having the same transaction ID is generated again, a case (Type 2-2) that a response message arrives from a server in the state that there is not any request message, and a case (Type 2-3) that in the state that there is not any response to the request message having the former function code and data although having a different transaction ID, a request message having the same function code and data is generated again. Such types also have a possibility to interrupt a normal operation of the control system although the request message is not continuously generated.

FIG. 6 indicates a case (Type 3) that a client transmits a request message having the same function code and data again while a server that has received a request message having a specific function code and data of a client returns an error message to the client. Additionally, the request message having the same function code and data that induce such an error message is not limited to the same TCP session, differently from the Types 1 and 2. That is, there is a possibility that a number of clients induce abnormal traffics simultaneously in preparation for an error induction.

FIG. 7A illustrates a table structure to detect types of abnormal traffic in accordance with an embodiment of the present invention, and the same format is used in detection methods of Type 1, Type 2 and Type 3. That is, it is required to manage and trace a transmission/reception message between control systems in order to detect the traffic types.

As illustrated in FIG. 7A, a MODBUS/TCP Ethernet packet 400 includes an Ethernet header 410, an IP header 420, a TCP header 430, and a MODBUS ADU 440.

The IP header 420 of relevant table entry fields of the MODBUS/TCP Ethernet packet 400 as illustrated above includes an IP address of a client (SIP: Source IP) 421, and an IP address of a server (DIP: Destination IP) 422. The TCP header 430 includes a service port of a client (sport: source port) 431. Since the service port of a server is 502, there is no need to manage it separately. In other words, since it indicates a TCP session to which the relevant MODBUS transmission/reception message belong, it does not matter to receive a separate identification ID from the TCP session management unit 110 to manage it. The MODBUS ADU 440 includes a transaction ID field 441 being a transmission/reception message identifier in the relevant session, a length field 442 for unit ID, function code and data, and a data field 443.

In this regard, since the length field 442 does not exceed 10, only 4 bits are required and accordingly a data field to be managed also does not exceed 10 bytes. That is because it is possible to know whether or not the same request message even comparing up to just 10 bytes as is in the example of the MODBUS PDU request message in FIG. 7B. That is, no matter how long a length of message collected actually is, an actual management table is managed up to size 10. It enables resources to be used efficiently when managing a transmission/reception message between control systems.

Figure 8:
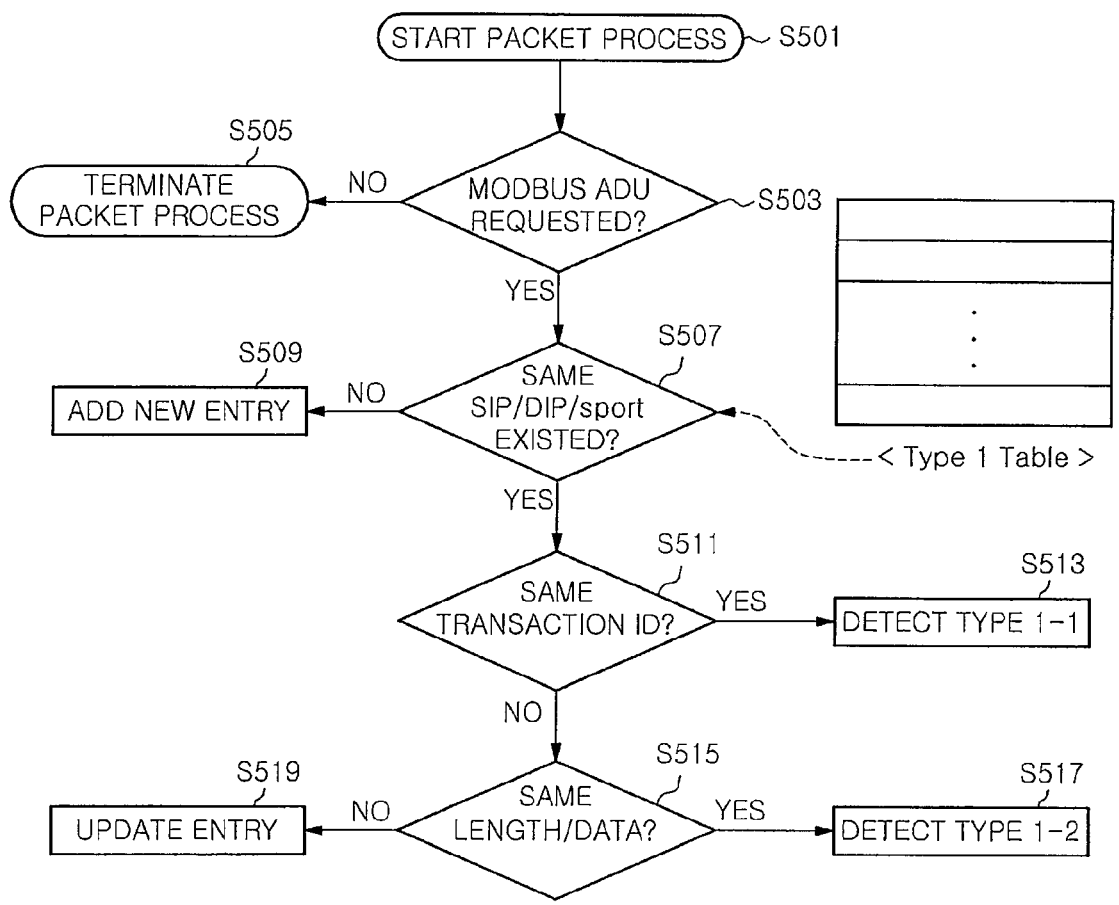
FIG. 8 is a flow chart illustrating a detection mechanism for Type 1 shown in FIG. 4.

FIG. 8 is a flow chart illustrating a detection method for Type 1 shown in FIG. 4.

First, when a packet is received, in operation S501, it is determined whether it is a MODBUS ADU request message, in operation S503. It can be determined by determining whether dport of the received packet is 502. If determined not to be a MODBUS ADU request message, the next packet is received, in operation S505. If determined to be a MODBUS ADU request message, it is determined whether a combination of SIP, DIP and sport of the relevant packet exists in the management table, in operation S507. If determined not to exist, a new entry is added to the table, in operation S509, and if determined to exist, it is determined whether a transaction ID in the relevant table entry is the same as that of a received message, in operation S511. If determined to be same, an abnormal traffic of the Type 1-1 is detected, in operation S513. If determined not to be same, it is determined whether data within 10 bytes starting from a unit ID of the received message and length thereof are the same as those of the relevant entry, in operation S515. If determined to be same, an abnormal traffic of Type 1-2 is dete613

613cted, in operation S517. If determined not to be same, the relevant entry is updated with currently received packet information, in operation S519. That is, the session (SIP/DIP/sport) exists same, and the relevant table entry information is updated with information on the transaction ID and length/data of currently received message. That is, one entry for each session exists for Type 1 table information to continuous abnormal messages. Here, actions to the detection result may include several methods such as a method to filter the relevant message and a method to transfer information only. Further, entries managed in each session may be deleted using a suitable timer or using information on termination of the relevant session from the TCP session management unit 110. Actions to such detection result and entry deletion method may be applied to methods below in the same manner.

FIG. 9 is a flow chart illustrating a detection method for Type 2 shown in FIGS. 5A and 5B. This method performs an analysis for all transmission/reception messages, differently from the Type 1.

First, when a packet is received, in operation S601, it is determined whether it is a MODBUS request message, in operation S603. If determined to be the MODBUS request message, it is determined whether session information (SIP/DIP/sport) of the received packet exists in a table, in operation S605. If determined not to exist, a new entry is added, in operation S607. However, if determined to exist, it is checked whether the same transaction ID exists, in operation S609. If an entry having the same value as that of a transaction ID of the received message exists, the Type 2-1 is detected, in operation S611. If an entry having the same transaction ID as that of a transaction ID of the received message does not exist, it is checked whether an entry having the same data and length thereof as those within 10 bytes starting from a unit ID of the received message exists, in operation S613. If the entry having the same data exists, an abnormal traffic of Type 2-3 is detected, in operation S615. If it is checked that the data portion also is not same, this is also added as a new entry, in operation S607. That is, while a structure of a table field is the same as that of the Type 1, several entries may be constructed with the same session (see FIG. 10). Next, even when the received packet is a MODBUS reply message, in operation S617, it is checked whether session information of the received packet exists in the table, in operations S619 and S621. Here, when comparing the session information, DIP/SIP/dport combination of the received packet should be compared with the SIP/DIP/sport combination in the table. It is because the reply message is transferred from the server to the client. If an entry having the relevant session information does not exist, or an entry having the same transaction ID is not registered even when the entry having the relevant session information exists, an abnormal traffic of Type 1 is detected, in operation S623. On the other hand, if an entry having the same transaction ID exists, the relevant entry is deleted, in operation S625. Actions to other detection results and other entry detection methods are the same as those mentioned in FIG. 8.

Figure 10A:
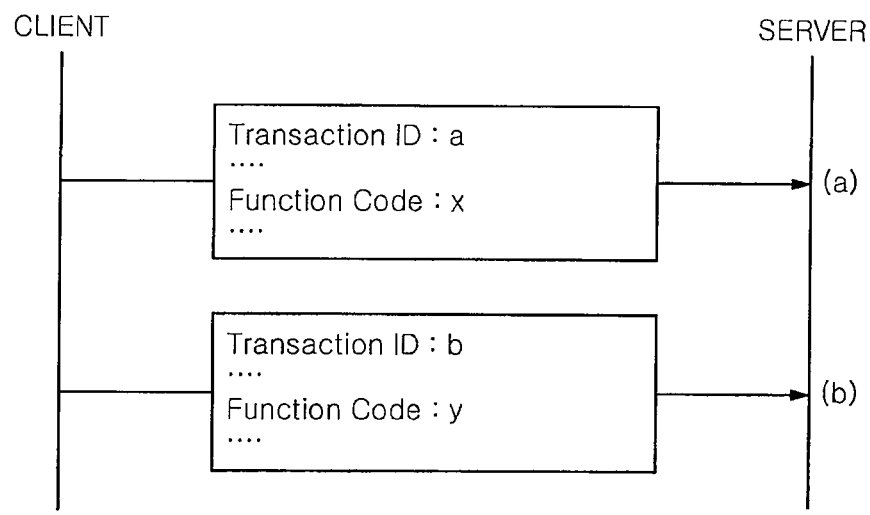

FIGS. 10A and 10B illustrate, by way of a simple example, a difference between entry storage methods of a table used in the detection method of Type 1 and a table used in Types 2 and 3. When a message having a transaction ID of 'a' and a function code of 'x' is transferred from a client to a server and then a message having a transaction ID of 'b' and a function code of 'y' is transferred from a client to a server, as shown in FIG. 10A, one entry for each session is stored in a table of Type 1, and a number of entries for each session are stored in the table used for Types 2 and 3 as shown in FIG. 10B. The detection function is performed in the method as described above.

FIG. 11 illustrates a structure of an exception table that is additionally used to detect types of abnormal traffic of Type 3, which may use a DIP 422, a length 442 and a data 443 only in an existing table. Its use method will be described with reference to FIG. 12.

Figure 12:
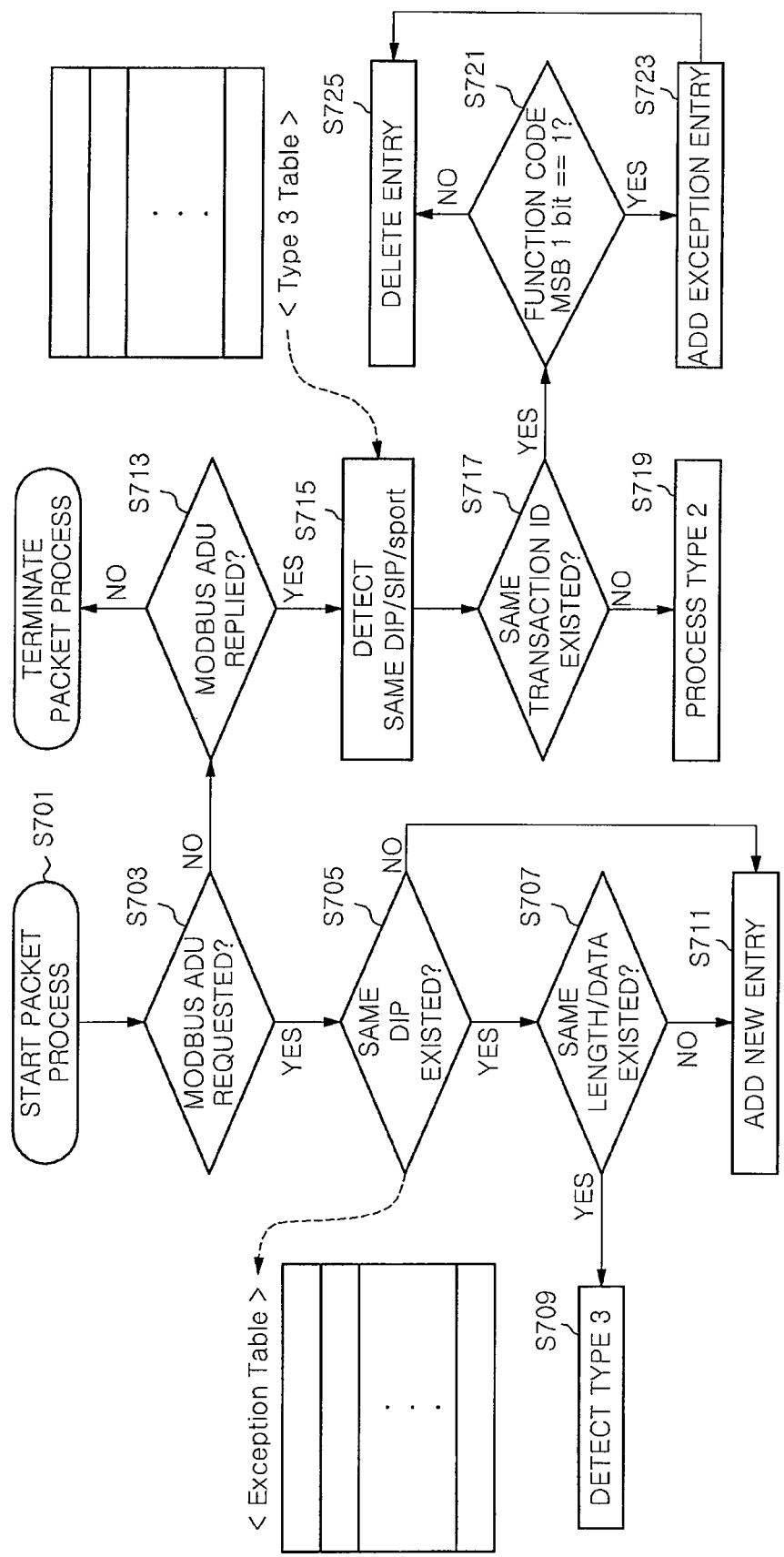
FIG. 12 is a flow chart illustrating a detection mechanism for Type 3 shown in FIG. 6.

FIG. 12 illustrates a detection method for Type 3. It performs an analysis for all transmission/reception messages like Type 2.

First, when a packet is received, in operation S701, it is determined whether it is a MODBUS request message, in operation S703. If determined to be the MODBUS request message, it is checked whether a DIP of the relevant message exists in an exception table, in operation S705. If checked to exist, it is checked whether an entry having the same data and length thereof as those within 10 bytes starting from a unit ID of the received message exists, in operation S707. If checked to exist, an abnormal traffic of Type 3 is detected, in operation S709. If an entry having the relevant DIP does not exist, or its data portion is not same even though the entry having the relevant DIP exists, a new entry having information of the relevant message is added to the Type 3 table, in operation S711.

Next, when the received packet is the MODBUS reply message, in operation S713, it is checked whether session information of the received packet exists within the Type 3 table. Here, a relevant session information comparison is performed by comparing a DIP/SIP/dport combination of the received packet with a SIP/DIP/sport combination within the table like the Type 2 detection method, in operation S715.

If the entry having the relevant session information does not exist, or the entry having the same transaction ID is not registered even though the entry exists, in operation 5717, a process is performed like the detection method of Type 2, in operation S719. On the other hand, if an entry having the same transaction ID exists, it is checked whether a function code of the received message indicates an error, in operation S721. If checked to indicate an error, an exception entry is generated based on information of the relevant entry and added to the exception table, in operation S723. Further, the entry of relevant Type 3 table is deleted, in operation S725. If checked not to indicate an error, an entry of the relevant Type 3 table only is deleted and the next packet analysis is performed, in operation S725. Actions to other detection results and additional entry deletion method of Type 3 table are the same as those mentioned in FIG. 8.

The exception table described above is a table to block an abnormal traffic that continuously generates a type of request that causes errors eventually, which operates regardless of whether or not the session is same, differently from Types 1 and 2. The entry deletion of such exception table can be managed by a suitable timer or using an operator-controllable method.

In accordance with the method for detecting an abnormal traffic on a control system protocol described above, there is provided a method for detecting an abnormal traffic efficiently and quickly, thereby providing a stable communication service between control systems. Further, since its operation can be implemented with little resources using the minimum table management, it also is possible to embody the method in hardware. First of all, the method for detecting an abnormal traffic provides a method for detecting various types of abnormal traffic that may occur on MODBUS TCP/IP. Further, such a method for detecting an abnormal traffic may be modified and applied to MODBUS Serial and MODBUS PLUS.

While the invention has been shown and described with respect to the embodiments, the present invention is not limited thereto. It will be understood by those skilled in the art that various changes and modifications may be made without departing from the scope of the invention as defined in the following claims.

What is claimed is:

1. A method for detecting an abnormal traffic on a control system protocol, the method comprising:
    checking whether session information exists in a management table when a received packet is a MODBUS request message;
    adding a new entry to the management table when the session information does not exist in the management table;
    checking whether a transaction ID in a table entry is the same as that of the received MODBUS request message when the session information exists in the management table;
    checking whether data and length thereof of the received MODBUS request message are the same as those in the table entry when the transaction ID of the table entry is not the same as that of the MODBUS request message;
    detecting an abnormal traffic when the transaction ID of the table entry is the same as that of the MODBUS request message, or the data of the table entry is the same as that of the MODBUS request message; and
    updating the table entry with packet information of the MODBUS request message when the data of the table entry is not the same as that of the MODBUS request message.

2. The method of claim 1, further comprising:
    deleting the MODBUS request message detected as the abnormal traffic, or alerting detection of the abnormal traffic.

3. The method of claim 1, wherein the table entry managed in the management table is deleted by a timer or using session termination information.

4. A method for detecting an abnormal traffic on a control system protocol, the method comprising:
    checking whether session information exists in a management table when a received packet is a MODBUS request message;
    checking whether a transaction ID in a table entry is the same as that of the received MODBUS request message when the session information exists in the management table;
    checking whether data and length thereof of the received MODBUS request message are the same as those in the table entry when the transaction ID of the table entry is not the same as that of the MODBUS request message;
    adding a new entry to the management table when the session information does not exist in the management table or when the data and length thereof of the received MODBUS request message are not the same as those in the table entry; and
    detecting an abnormal traffic when the transaction ID in the table entry is the same as that of the MODBUS request message and when the data of the received MODBUS request message is the same as that in the table entry.

5. The method of claim 4, further comprising:
    checking whether session information exists in the management table when the received packet is a MODBUS reply message;
    deleting, when an entry having the same session information as that of the MODBUS reply message exists in the management table, the entry; and
    detecting, when an entry having the same session information as that of the MODBUS reply message exists in the management table, an abnormal traffic when an entry having the same session information as that of the MODBUS reply message exists in the management table while an entry having the same transaction ID as that of the MODBUS reply message is not registered.

6. The method of claim 4, further comprising:
    deleting the MODBUS request message detected as an abnormal traffic or alerting an abnormal traffic detection.

7. The method of claim 4, wherein the table entry managed in the management table is deleted by a timer or using session termination information.

8. A method for detecting an abnormal traffic on a control system protocol, the method comprising:
- checking whether session information exists in an exception table when a received packet is a MODBUS request message;
- checking whether data of the MODBUS request message is the same as that in an entry existing in the exception table when the session information exists in the management table;
- adding a new entry having information of the relevant message to the exception table when the session information does not exist in the management table, or the data of the MODBUS request message is not the same as that in an entry existing in the exception table even though the session information exists in the management table; and
- detecting an abnormal traffic when the session information exists in the management table and an entry having the same data as the MODBUS request message exists in the management table.

9. The method of claim 8, further comprising:
- checking whether session information exists in the management table when the received packet is a MODBUS reply message;
- detecting an abnormal traffic when an entry having the same session information as the MODBUS reply message does not exist in the management table;
- checking whether a function code of the MODBUS reply message indicates an error when an entry having the same session information as the MODBUS reply message exists in the management table and when an entry having the same transaction ID as the MODBUS reply message exists in the message table; and
- generating an exception entry based on information of the relevant entry and adding the exception entry to an exception table when a function code of the MODBUS reply message indicates an error.

10. The method of claim 9, further comprising:
- deleting an entry of the management table when a function code of the MODBUS reply message does not indicate an error or after the exception entry is added to the exception table.

11. The method of claim 8, further comprising:
- deleting the MODBUS request message that is detected as an abnormal traffic or alerting an abnormal traffic detection.

12. The method of claim 8, wherein the table entry managed in the management table is deleted by a timer or using session.

* * * * *